(12) United States Patent
Amate López et al.

(10) Patent No.: US 9,573,662 B2
(45) Date of Patent: Feb. 21, 2017

(54) TENSION-LEG FLOATING PLATFORM THAT IS PARTICULARLY SUITABLE FOR HARNESSING WIND ENERGY

(71) Applicant: IBERDROLA INGENIERÍA Y CONSTRUCCIÓN, S.A.U., Erandio (Vizcaya) (ES)

(72) Inventors: Juan Amate López, Erandio (ES); Bernardino Couñago Lorenzo, Erandio (ES); Pablo Gómez Alonso, Erandio (ES); Marta Caicoya Ferreiro, Erandio (ES); Oscar Sainz Avila, Erandio (ES)

(73) Assignee: Iberdrola Ingenieria Y Construccion, S.A.U., Erandio (Vizcaya) (ES)

( * ) Notice: Subject to any disclaimer, the term of this patent is extended or adjusted under 35 U.S.C. 154(b) by 0 days.

(21) Appl. No.: 14/434,035

(22) PCT Filed: Oct. 8, 2013

(86) PCT No.: PCT/ES2013/070695
§ 371 (c)(1),
(2) Date: Apr. 7, 2015

(87) PCT Pub. No.: WO2014/057154
PCT Pub. Date: Apr. 17, 2014

(65) Prior Publication Data
US 2015/0259044 A1      Sep. 17, 2015

(30) Foreign Application Priority Data

Oct. 8, 2012   (ES) .................................. 201231547

(51) Int. Cl.
*B63B 35/44*    (2006.01)
*B63B 21/50*    (2006.01)

(52) U.S. Cl.
CPC .............. *B63B 21/502* (2013.01); *B63B 35/44* (2013.01); *F03D 13/20* (2016.05); *B63B 2035/446* (2013.01)

(58) Field of Classification Search
CPC .............. B63B 9/00; B63B 9/06; B63B 9/065; B63B 21/50; B63B 21/502; B63B 35/44; B63B 21/00; F03D 11/04
(Continued)

(56) References Cited

U.S. PATENT DOCUMENTS 5,421,676 A     6/1995  Wybro et al.
5,964,550 A  * 10/1999  Blandford ............. B63B 21/502
                                                        114/265
(Continued)

FOREIGN PATENT DOCUMENTS

EP      1174336 A1    1/2002
GB      2378679 A     2/2003

*Primary Examiner* — Lars A Olson
(74) *Attorney, Agent, or Firm* — McNees Wallace & Nurick LLC

(57) ABSTRACT

The invention shows improved operational conditions. It comprises a floating structure with a single floating central body (1), provided with an elongated configuration according to a longitudinal direction, wherein the lower portion of the central body (1) is intended to be submerged. It additionally comprises: a base (3) located in the upper portion of the central body (1) to support at least one wind turbine (4); and at least four legs (2) located in the lower portion of the central body (1) and provided with: a) a first end, by which they are integrally attached to the central body (1); b) a second end, opposite to the first end, and more distant from the central body (1); and c) at least a porch (6) located in the second end of each leg (2), said porch (6) comprising a first drilling (12) in longitudinal direction to anchor the floating platform to the sea bed (5).

17 Claims, 5 Drawing Sheets

(58) Field of Classification Search
USPC ...... 114/265; 405/204, 205, 209, 223.1, 224
See application file for complete search history.

(56) References Cited

U.S. PATENT DOCUMENTS

| | | | |
|---|---|---|---|
| 8,657,534 B2* | 2/2014 | Jahnig | B63B 21/50 405/223.1 |
| 2004/0105725 A1* | 6/2004 | Leverette | B63B 21/502 405/223.1 |
| 2010/0150664 A1* | 6/2010 | Jakubowski | B63B 21/502 405/224 |
| 2012/0183359 A1* | 7/2012 | Nordstrom | B63B 35/003 405/205 |

\* cited by examiner

TENSION-LEG FLOATING PLATFORM THAT IS PARTICULARLY SUITABLE FOR HARNESSING WIND ENERGY

OBJECT OF THE INVENTION

The present invention may be included in the technical field for the generation of electrical power, in particular for obtaining electrical power from the wind and/or other renewable sources as for example tides, waves and currents, in offshore facilities.

More specifically, the object of the invention refers to a floating platform to be especially applied to the offshore and/or hybrid wind power utilisation.

BACKGROUND OF THE INVENTION

Floating tension-leg platforms, or TLP (Tension Leg Platform), are terms referring to floating structures partially submerged in the sea, which are anchored to the sea bed by means of anchoring elements which work by traction, and wherein said structures keep their static position thanks to the balance between thrust forces due to flotation, and fastening forces generated by the anchoring elements, since the thrust forces are strong enough as to produce the required traction in the anchoring elements.

Offshore platforms have been used in the oil and gas industry to obtain hydrocarbons in deep sea areas. Applying floating structures to the field of wind power utilisation and/or other renewable sources is limited to a few projects which are still in the implementation phase, and to some others which are still in the conceptual phase. Among the first, it should be highlighted the so called Hywind project, by means of which a spar type floating structure was built, which is formed by a longitudinal body held in flotation by means of cables connected at their upper end to the body contour and which are weighed down, at their lower end, with weights resting on the sea bed. However, it is important to highlight that the projects mentioned above use floating foundations of a type different to TLPs, mainly semi-submersible and in some cases of the "Spar" type.

It is desirable to define a floating structure of the TLP type in order to use it for obtaining electricity from wind power and/or other renewable sources in sea facilities, which shows better performance and applicability than the platforms from the state of the art.

Document GB2378679 discloses a floating tension-leg platform for wind energy utilisation, comprising a floating structure which in turns comprises a single floating central body provided with an elongated configuration according to a longitudinal direction, being the central body provided with an upper portion and a lower portion, wherein the lower portion is intended to be submerged, a base located in the upper portion of the central body and at least a wind turbine and a plurality of tendons, having an elongated configuration and being adapted to support traction strains, wherein the tendons comprise lower ends intended to be connected to the anchoring elements.

DESCRIPTION OF THE INVENTION

The present invention solves the technical problem stated, by means of a tension floating platform to be especially applied for obtaining electrical power from wind power and/or other renewable sources in sea facilities.

The platform of the invention comprises a single floating central body. The central body has a configuration which is elongated with respect to a longitudinal direction which, when in use, is substantially vertical. Preferably, the central body features symmetry around an axis oriented according to the longitudinal direction. For example, the central body may comprise one of several cylindrical and/or tapered segments longitudinally arranged.

In the central body a lower and an upper portion can be distinguished. The lower portion of the central body is intended to be submerged up to an altitude referred to as draft. The upper portion of the central body comprises a top end provided with a base, on which a wind turbine will be arranged supported by the platform of the invention. The wind turbine may have either a vertical axis or a horizontal axis, and in this last case it may be either two or three bladed.

At least four legs (also referred to as pontoons) extending outwardly, come out from the lower portion of the central body. The central body and the pontoons together constitute a floating structure. The pontoons confer stability to the floating structure, fundamentally against overturning. The pontoons comprise a first end, by which they are attached to the lower portion of a central body, and a second end, opposing the first end, and more distantly spaced from said central body.

In order to anchor the floating structure to the sea bed, the floating platform of the invention additionally incorporates, as it is explained below, brackets placed in the second ends of the pontoons; anchoring elements; and tendons provided with upper ends and lower ends, wherein the upper ends are connected to the brackets and the lower ends are connected to the anchoring elements. The anchoring elements are preferably piles driven into the sea bed.

Tendons are elongated elements intended to support traction strains. They can adopt several configurations, for example: steel cables, synthetic material cables and steel tubes.

In the upper end of each tendon, there is a cable clamp arranged, for connecting the tendon with its corresponding bracket, cooperating with a first connector. Each first connector comprises an upper end and a lower end, wherein the upper end comprises an upper bore for articulating the connector and the cable clamp, whereas the lower end comprises a lower bore not parallel to the upper bore, preferably perpendicular, for articulating the first connector with a tendon. The non-parallel arrangement of an upper bore and a lower bore enables the first connector to provide a relative rotation between each tendon and its bracket around two axes, consequently preventing the unnecessary transmission of torsional stress between tendon and bracket.

As it has been mentioned above, there is at least one bracket located in each of the second ends of the pontoons. Each one of the brackets incorporates a through bore in a vertical direction to accommodate connecting means intended to be connected to the first connector of a tendon.

Anchoring elements are driven into the sea bed, the upper part of which projects from the sea bed and is provided with fixing means to connect the tendons lower ends.

Since the thrust experimented by the floating structure is greater than the weight of said floating structure, the tendons, connecting the floating structure pontoons to the anchoring elements anchored to the sea bed, are subjected to traction strains which are transmitted to the structure, so as to keep said structure fixed in the sea. The tendons tension limits the movements in a vertical direction, whereas tendons attachment to the anchoring elements and the pontoons brackets limits the horizontal movements and overturning.

The arrangement of at least four pontoons confers stability to the floating structure in case that tendons from one of the pontoons break. In fact, if the tendon or tendons from one of the pontoons fail, the at least three remaining pontoons may provide stability to the floating structure, so that the floating structure stands, even though it can eventually be out of work. In case of failure of the tendons from one of the pontoons when there are only three pontoons, overturning of the floating structure would be imminent.

The present invention discloses a tension floating platform to be used in the field of wind power utilisation in sea areas, being lighter and more manageably than the TLPs used in offshore hydrocarbons exploitation, and having better operational conditions than other floating platforms designed for wind exploitation.

The invention may additionally incorporate a device intended for wave energy utilisation, which is preferably arranged floating at water level and attached by means of guides to the central body of the platform.

The pontoons and the central body of the floating platform are divided into compartments, and the platform additionally incorporates a set of pumps and a control system, to pump and extract liquid (usually water) from the compartments, and thus change the platform draft conveniently, to carry out floating, transport and mooring operations.

DESCRIPTION OF THE DRAWINGS

To implement the present description and in order to provide a better understanding of the characteristics of the invention, according to a preferred embodiment thereof, a set of drawings is attached as part of this description, with an illustrative but not limitative purpose, which represents the following.

PREFERRED EMBODIMENT OF THE INVENTION

The following is a detailed description of a preferred embodiment of the invention, referring to FIGS. 1 to 5 above.

Figure 1:
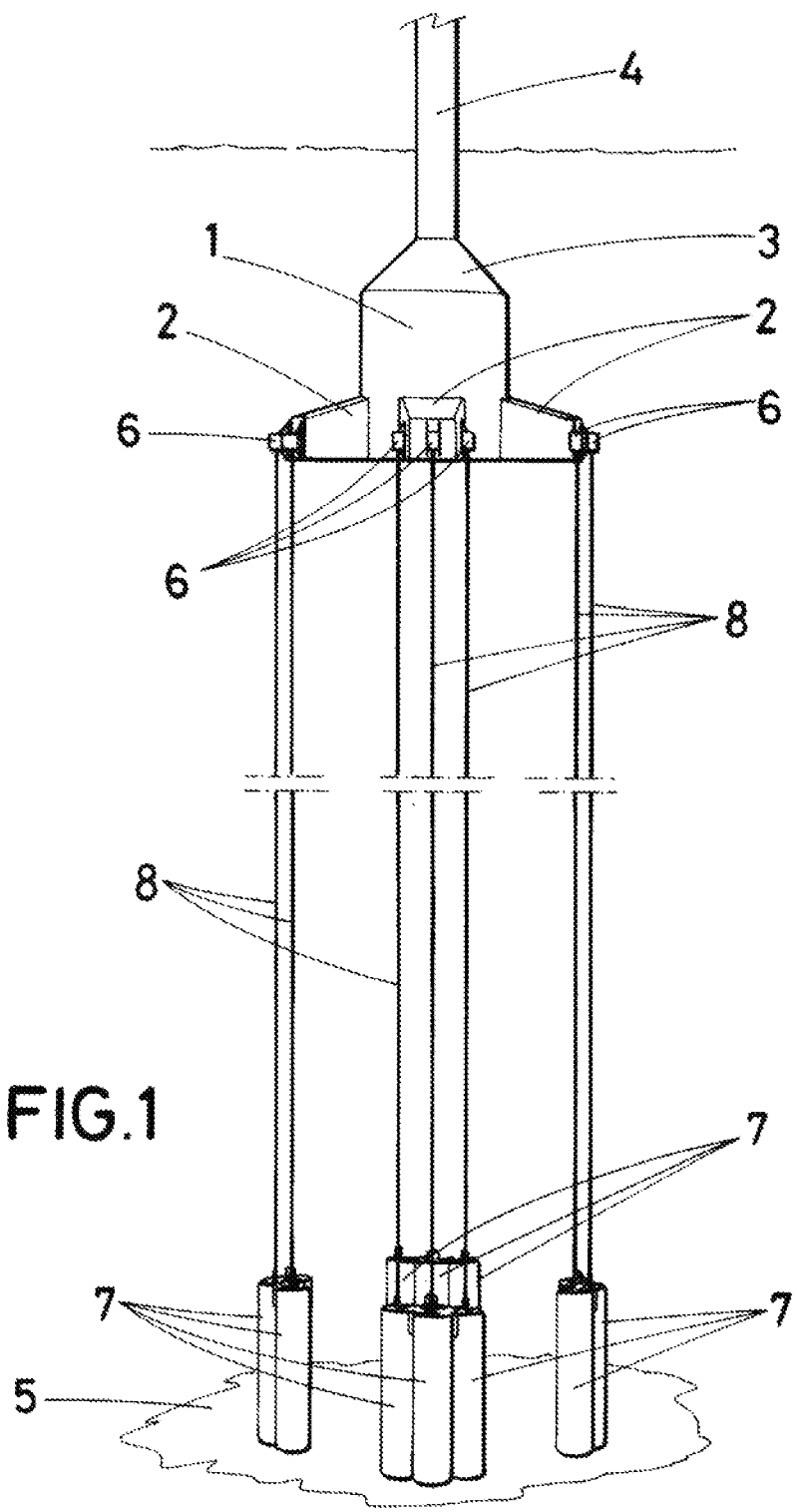
FIG. 1.—It shows a perspective view of the platform of the invention.

As it is shown in FIG. 1, the floating tension-leg platform for wind source utilisation in the sea, according to the present invention, comprises a floating structure formed by a single floating central body (1) and four pontoons (2) coming out from the central body (1).

The central body (1) features a configuration which is elongated with respect to a longitudinal direction which is substantially vertical, as well as the central body (1) is provided with rotational symmetry around an axis oriented according to the longitudinal direction.

The central body (1) comprises a lower portion and an upper portion. The lower portion is submerged up to an altitude referred to as draft. The upper portion comprises a top end provided with a base (3) on which a wind turbine (4) is placed supported by the floating structure.

As it has been mentioned above, the lower portion of the central body (1) comprises a lower end from which four pontoons (2) come out, arranged symmetrically and at equidistant angles in the lower end perimeter. The pontoons (2) comprise a first end, by means of which they are integrally attached to the central body (1), and a second end, opposing the first end, and more distant from the central body (1).

Figure 2:
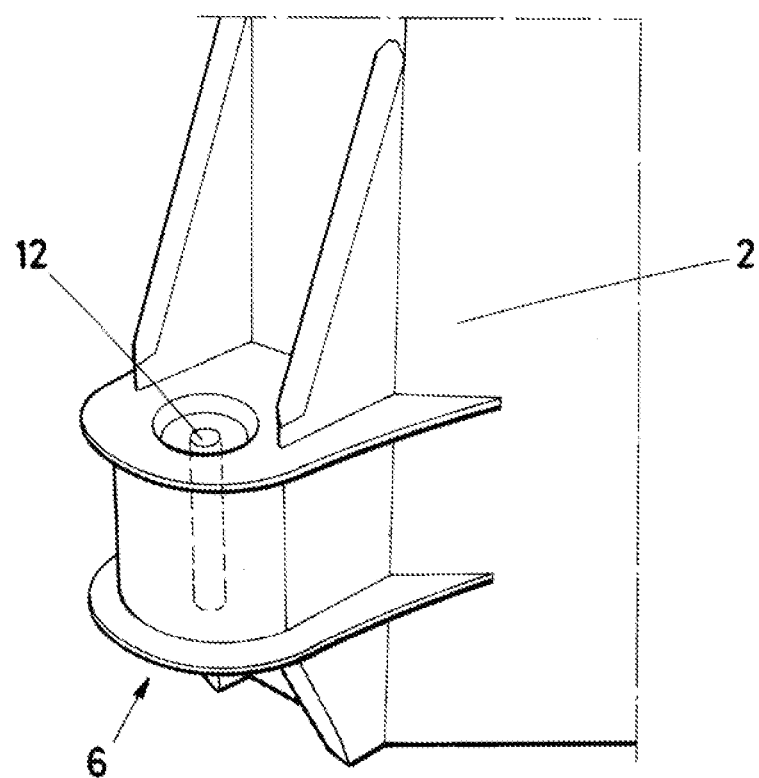
FIG. 2.—It shows a detail of a bracket.
Figure 3:
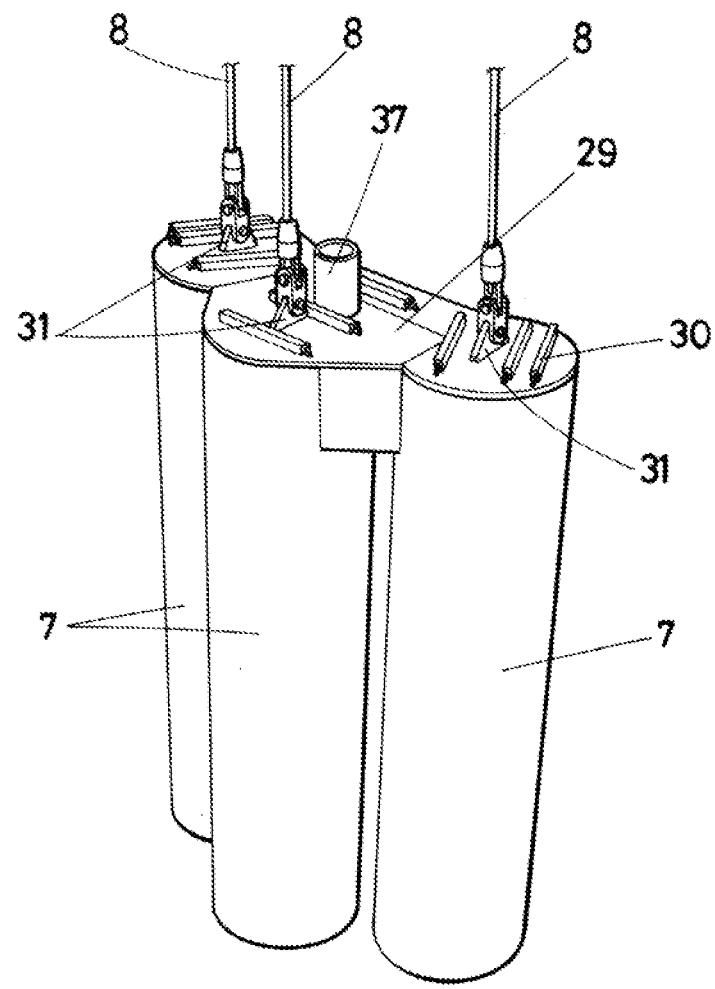
FIG. 3.—It shows a detail of the piles.

In order to anchor the floating structure to the sea bed (5), the platform of the invention additionally includes, as it will be explained below, brackets (6), shown in more detailed in FIGS. 2 and 4, and which are located in the second ends of the pontoons (2); anchoring elements, preferably piles (7) partially driven into the sea bed (5) and shown in more detailed in FIG. 3; and tendons (8) each provided with upper ends connected to the brackets (6), as well as lower ends connected to the piles (7), see FIG. 1.

The tendons (8) are elongated elements intended to support traction strains. In the upper ends of the tendons (8), said tendons (8) comprise first connecting means (13) to connect each tendon (8) to its corresponding bracket (6), as it will be explained below.

Figure 4:
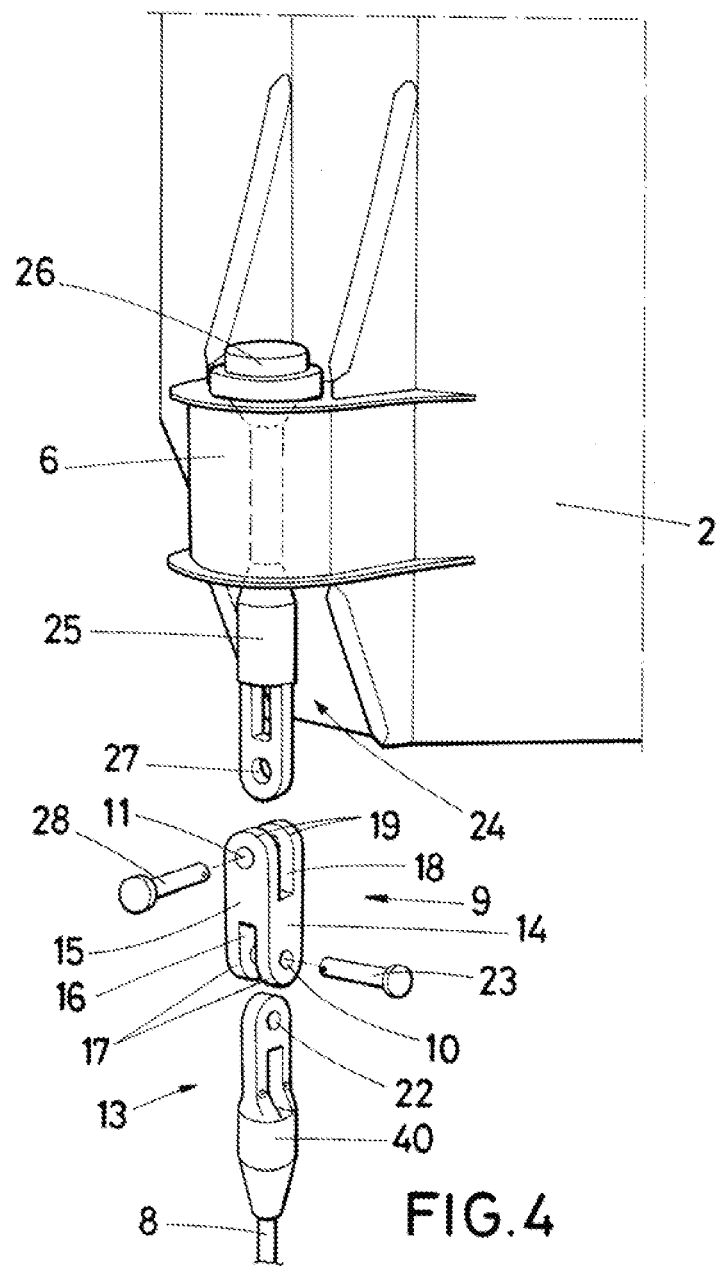
FIG. 4.—It shows a detail of the process of connecting a tendon to its corresponding bracket.

To connect the brackets (6) of the pontoons (2) to the first connecting means (13) of the upper part of the tendons (8), the invention additionally includes cable clamps (40), cooperating with first connectors (9), see FIG. 4. The cable clamps (40) are arranged in the upper end of the tendons (8), whereas the first connectors (9) comprise an upper end and a lower end, wherein the upper end comprises an upper bore (11), for articulating the first connector (9) to its tendon (8), whereas the lower end comprises a lower bore (10) perpendicular to the upper bore (11), for articulating the first connector (9) with its corresponding tendon (8). The arrangement of an upper bore (11) and a lower bore (10), non-parallel to each other, enables the first connector (9) to provide a relative rotation between each tendon (8) and its bracket (6) around two axes, thus preventing the unnecessary transmission of torsional stress between tendon (8) and bracket (6).

According to a preferred embodiment, the first connectors (9) have a substantially parallelepiped shape defined by four side faces (14, 15), which comprise two first side faces (14) opposite to each other and two second side faces (15), also opposite to each other and perpendicular to the first side faces (14).

A lower groove (16) being in the lower end of the first connectors (9), goes through the two first side faces (14), leaving the lower end open in said first side faces (14), and defining in each of the second side faces (15) first lugs (17) separated by the lower groove (16). Similarly, an upper groove (18) being in the upper end of the first connector (9), goes through the two second side faces (15), leaving the upper end open in said second side faces (15) and defining in each of the first side faces (14) second lugs (19) separated by the upper groove (18). The lower through bore (10) goes through the first lugs (17), same as the upper through bore (11) goes through the second lugs (19).

The cable clamps (40) comprise a lower end attached to the upper end of each tendon (8), comprising as well an flat upper end provided with a first hole (22), wherein said upper end is to be inserted in the lower groove (16), with the lower bore (10) facing the first hole (22), so that each cable clamp (40) is connectable with the first connector (9) through the first bolt (23) going through the lower bore (10) and the first hole (22).

In each one of the second ends of the pontoons (2) there is at least a bracket (6) arranged for connecting a tendon (8) to the pontoons (2), leaving a rotation with respect to an axis oriented according to the longitudinal direction of the tendon (8) as degree of freedom between the tendon (8) and the bracket (6). Each one of the brackets (6) includes a first through drilling (12) in vertical direction to accommodate second connecting means (24).

The second connecting means (24) comprise a connecting body (25) provided with an upper end and a lower end. In the upper end of the connecting body (25), there is a stopper (26) to keep the upper end of the connecting body (25) outside the first drilling (12). The lower end of the connecting body (25) is flat and is provided with a second hole (27), wherein said lower end is to be inserted in the upper groove (18), so that the second connecting means (24) is connectable to the first connector (9) through a second bolt (28) which goes through the upper bore (11) and the second hole (27).

There are piles (7) driven into the sea bed (5), the upper portion of which projects from the sea bed (5) and is provided with fixing means to connect the lower ends of the tendons (8). The piles (7) are provided to be distributed in as many assemblies as pontoons (2) comprised in the floating structure, where each assembly preferably comprises as many piles (7) as brackets (6) found in each pontoon (2). The piles (7) of the same assembly may be integral to each other, being attached at their upper portion through joining plates (29). In said joining plates (29), there are fixing means arranged, as well as a plurality of sacrificial anodes (30).

Figure 5:
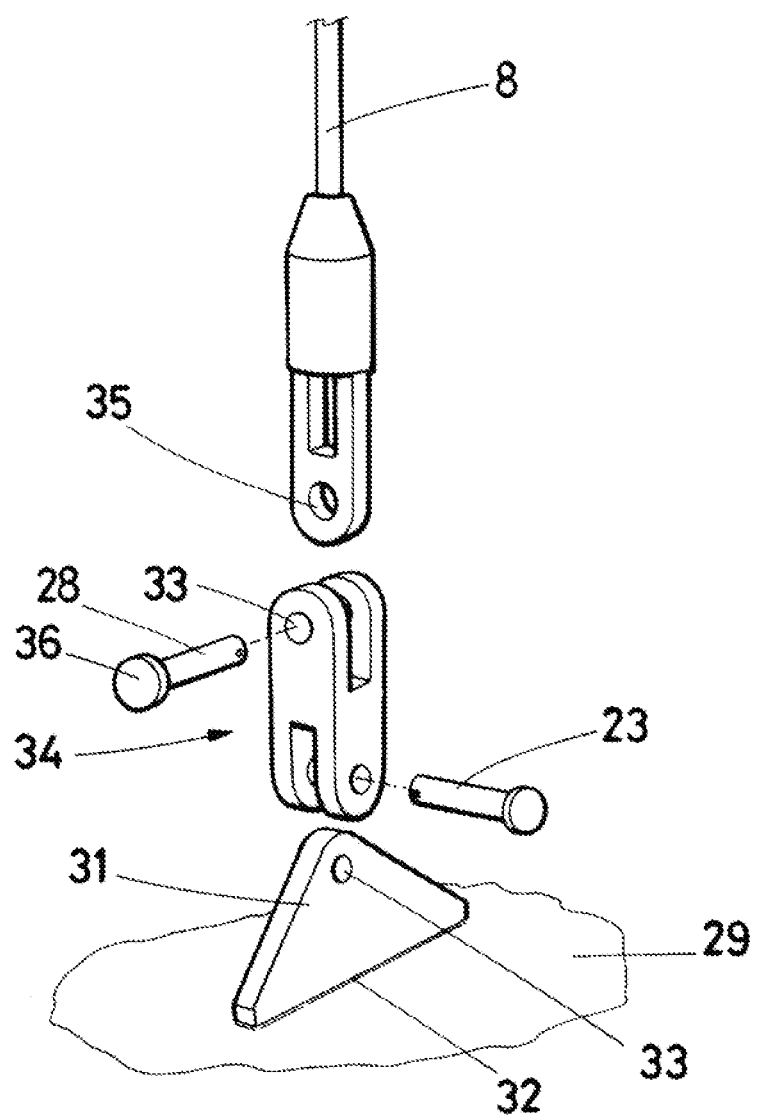
FIG. 5.—It shows the process of fixing a tendon to its corresponding pile.

Preferably, as it can be seen in FIG. 5, the fixing means include a plurality of plates (31), preferably having a triangular base, wherein one of the side faces (32) of each plate (31) is fixed to the joining plate (29). The plate (31) comprises, preferably near the vertex more distant from the joining plate (29), a third hole (33). In turn, the lower portion of the tendons (8) include third connecting means provided with a first end fixed to the lower end of the tendons (8), and with a second end provided with a second drilling (35), wherein the second end enables to seize the plate (31) on both sides of said plate (31) in the third hole (33) area, being the third hole (33) and the second drilling (35) opposite to each other, so that a third bolt (36) can be inserted simultaneously in the third hole (33) and in the second drilling (35) to fix the tendon (8) to the plate (31).

According to a preferred embodiment, the third connecting means comprise a second connector (9) shown in FIG. 4, which permits the fixation between tendons (8) and plates (31) to avoid unnecessary transmission of torsional stress.

The piles (7) may be suction piles (7), in such a way that, in the joining plates (29), there are mouths (37) arranged to connect a pump (not shown) producing the required suction to insert the piles (7) of each of the assemblies.

The invention claimed is:

1. A floating tension leg platform for wind energy utilisation, comprising:
   a floating structure which in turns comprises a single floating central body, provided with an elongated configuration according to a longitudinal direction, the central body being provided with an upper portion and a lower portion, wherein the lower portion is intended to be submerged,
   a base located in the upper portion of the central body, at least one wind turbine supported on the base;
   four pontoons, emerging from the lower portion of the central body and provided with:
      a first end, by means of which each pontoon is integrally attached to the central body,
      a second end, opposite to the first end, and more distant from the central body, and
      at least one bracket located in the second end of each pontoon, said bracket comprising a first drilling in the longitudinal direction to anchor the floating platform to the sea bed;
   anchoring elements for fixing the platform to a sea bed;
   a plurality of tendons, having an elongated configuration and being adapted to support traction strains, wherein the tendons comprise:
      upper ends intended to be connected to the brackets, and
      lower ends intended to be connected to the anchoring elements;
   wherein the central body and the pontoons together constitute a floating structure, wherein the central body and the pontoons are divided into compartments;
   wherein the platform further comprises:
      a cable clamp mounted in the upper end of each tendon, to connect said tendon with its corresponding bracket, and
      a first connector, comprising:
         an upper end provided with an upper bore for articulating the first connector with the cable clamp, and
         a lower end provided with a lower bore non-parallel to the upper bore, for articulating the first connector with a tendon.

2. The platform of claim 1, wherein the upper bore and the lower bore have perpendicular directions.

3. The platform of claim 1, wherein the first connectors have a substantially parallelepiped shape defined by side faces, said first connectors comprising:
   two first side faces opposite to each other; and
   two second side faces, also opposite to each other, wherein the first connectors additionally comprise:
   an upper end;
   a lower end;
   a lower groove located in the lower end of the first connector going through the two first side faces, leaving the lower end open in said first side faces and defining in each of the second side faces first lugs separated by the lower groove; and
   an upper groove located in the upper end of the first connector going through the two second side faces, leaving the upper end open in said second side faces and defining in each of the first side faces second lugs separated by the upper groove;
   wherein the lower bore goes through the first lugs; as well as the upper bore goes through the second lugs.

4. The platform of claim 3, wherein the tendons additionally include first connecting means located in the upper ends of the tendons, for connecting each tendon to its corresponding bracket, wherein the first connecting means comprise:
   a lower end joined to the upper end of each tendon, and
   a flat upper end, provided with a first hole, wherein said upper end is to be inserted in the lower groove, with the lower bore facing the first hole.

5. The platform of claim 3, further comprising second connecting means, which are to be inserted in the first drillings for connecting brackets with tendons, wherein the second connecting means comprise:
   a connecting body provided with an upper end and with a flat lower end;
   a stopper located in a lower end of the connecting body for keeping said upper end outside the first drillings;
   a second hole located in the lower end of the connecting body, wherein said lower end is to be inserted in the upper groove, with the second hole facing the upper bore.

6. The platform of claim 1, wherein the anchoring elements are piles driven into, at least partially, the sea bed.

7. The platform of claim 6, wherein the piles are distributed in as many assemblies as pontoons are comprised in the floating structure, where each assembly of piles comprises as many piles as brackets comprised in each pontoon.

8. The platform of claim 7, further comprising a joining plate arranged in the upper portion of at least one of the assemblies of piles to make piles from the same assembly integral to each other.

9. The platform of claim 6 wherein the upper part of the piles comprises fixing means to connect the piles with the lower ends of the tendons, wherein the fixing means comprise a plurality of plates, comprising:
at least one side face fixed to the upper part of the pile; and
a third hole;
wherein the tendons additionally comprise, at their lower ends, third connecting means comprising:
a first end fixed to the lower end of the tendons; and
a second end enabling to seize the plate in the third hole area, the third hole and the second drilling being opposite to each other.

10. The platform of claim 2, wherein the first connectors have a substantially parallelepiped shape defined by side faces, said first connectors comprising:
two first side faces opposite to each other; and
two second side faces, also opposite to each other, wherein the first connectors additionally comprise:
an upper end;
a lower end;
a lower groove located in the lower end of the first connector going through the two first side faces, leaving the lower end open in said first side faces and defining in each of the second side faces first lugs separated by the lower groove; and
an upper groove located in the upper end of the first connector going through the two second side faces, leaving the upper end open in said second side faces and defining in each of the first side faces second lugs separated by the upper groove;
wherein the lower bore goes through the first lugs; as well as the upper bore goes through the second lugs.

11. The platform of claim 10, wherein the tendons additionally include first connecting means located in the upper ends of the tendons, for connecting each tendon to its corresponding bracket, wherein the first connecting means comprise:
a lower end joined to the upper end of each tendon, and
a flat upper end, provided with a first hole, wherein said upper end is to be inserted in the lower groove, with the lower bore facing the first hole.

12. The platform of claim 10, further comprising second connecting means, which are to be inserted in the first drillings for connecting brackets with tendons, wherein the second connecting means comprise:
a connecting body provided with an upper end and with a flat lower end;
a stopper located in a lower end of the connecting body for keeping said upper end outside the first drilling;
a second hole located in the lower end of the connecting body, wherein said lower end is to be inserted in the upper groove, with the second hole facing the upper bore.

13. The platform of claim 7 wherein the upper part of the piles comprises fixing means to connect the piles with the lower ends of the tendons, wherein the fixing means comprise a plurality of plates, comprising:
at least one side face fixed to the upper part of the pile; and
a third hole;
wherein the tendons additionally comprise, at their lower ends, third connecting means comprising:
a first end fixed to the lower end of the tendons; and
a second end enabling to seize the plate in the third hole area, the third hole and the second drilling being opposite to each other.

14. The platform of claim 8 wherein the upper part of the piles comprises fixing means to connect the piles with the lower ends of the tendons, wherein the fixing means comprise a plurality of plates, comprising:
at least one side face fixed to the upper part of the pile; and
a third hole;
wherein the tendons additionally comprise, at their lower ends, third connecting means comprising:
a first end fixed to the lower end of the tendons; and
a second end enabling to seize the plate in the third hole area, the third hole and the second drilling being opposite to each other.

15. A floating tension leg platform for wind energy utilisation, comprising:
a floating structure which in turns comprises a single floating central body, provided with an elongated configuration according to a longitudinal direction, the central body being provided with an upper portion and a lower portion, wherein the lower portion is intended to be submerged,
a base located in the upper portion of the central body,
at least one wind turbine supported on the base;
four pontoons, emerging from the lower portion of the central body and provided with:
a first end, by means of which each pontoon is integrally attached to the central body,
a second end, opposite to the first end, and more distant from the central body, and
at least one bracket located in the second end of each pontoon, said bracket comprising a first drilling in the longitudinal direction to anchor the floating platform to the sea bed;
anchoring elements for fixing the platform to a sea bed, the anchoring means being piles driven into, at least partially, the sea bed, wherein the piles are distributed in as many assemblies as pontoons are comprised in the floating structure, where each assembly of piles comprises as many piles as brackets comprised in each pontoon; and
a plurality of tendons, having an elongated configuration and being adapted to support traction strains, wherein the tendons comprise:
upper ends intended to be connected to the brackets, and
lower ends intended to be connected to the anchoring elements;
wherein the central body and the pontoons together constitute a floating structure, wherein the central body and the pontoons are divided into compartments;
and wherein the platform further comprises a joining plate arranged in the upper portion of at least one of the assemblies of piles to make piles from the same assembly integral to each other.

16. A floating tension leg platform for wind energy utilisation, comprising:
a floating structure which in turns comprises a single floating central body, provided with an elongated configuration according to a longitudinal direction, the central body being provided with an upper portion and a lower portion, wherein the lower portion is intended to be submerged, a base located in the upper portion of the central body, at least one wind turbine supported on the base;

four pontoons, emerging from the lower portion of the central body and provided with:
- a first end, by means of which each pontoon is integrally attached to the central body,
- a second end, opposite to the first end, and more distant from the central body, and
- at least one bracket located in the second end of each pontoon, said bracket comprising a first drilling in the longitudinal direction to anchor the floating platform to the sea bed;

anchoring elements for fixing the platform to a sea bed, the anchoring elements being piles driven into, at least partially, the sea bed; and a plurality of tendons, having an elongated configuration and being adapted to support traction strains, wherein the tendons comprise:
- upper ends intended to be connected to the brackets, and
- lower ends intended to be connected to the anchoring elements;

wherein the central body and the pontoons together constitute a floating structure, wherein the central body and the pontoons are divided into compartments; and wherein the upper part of the piles comprises fixing means to connect the piles with the lower ends of the tendons, wherein the fixing means comprise a plurality of plates, comprising:
- at least one side face fixed to the upper part of the pile; and
- a third hole;

wherein the tendons additionally comprise, at their lower ends, third connecting means comprising:
- a first end fixed to the lower end of the tendons; and
- a second end enabling to seize the plate in the third hole area, the third hole and the second drilling being opposite to each other.

17. The platform of claim 16, wherein the piles are distributed in as many assemblies as pontoons are comprised in the floating structure, where each assembly of piles comprises as many piles as brackets comprised in each pontoon.

* * * * *